United States Patent
Kena et al.

(10) Patent No.: US 10,639,963 B2
(45) Date of Patent: May 5, 2020

(54) PRESSURE RELIEF VALVE LINKED FOR MOVEMENT WITH DOOR PROTECTOR

(71) Applicant: FORD GLOBAL TECHNOLOGIES, LLC, Dearborn, MI (US)

(72) Inventors: Mukdam Kena, Sterling Heights, MI (US); Michael Murphy McElroy, South Lyon, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 174 days.

(21) Appl. No.: 15/834,164

(22) Filed: Dec. 7, 2017

(65) Prior Publication Data
US 2019/0178402 A1     Jun. 13, 2019

(51) Int. Cl.
*B60H 1/24* (2006.01)
*B60R 13/02* (2006.01)
*B60J 5/04* (2006.01)
*E06B 7/02* (2006.01)

(52) U.S. Cl.
CPC .......... *B60H 1/248* (2013.01); *B60H 1/243* (2013.01); *B60J 5/0412* (2013.01); *B60R 13/0243* (2013.01); *E06B 7/02* (2013.01)

(58) Field of Classification Search
CPC ....... B60R 13/043; B60R 19/42; B60H 1/248; B60H 1/249; B60H 1/243; E05Y 2900/531; B60J 10/86
See application file for complete search history.

(56) References Cited

U.S. PATENT DOCUMENTS

| | | | |
|---|---|---|---|
| 2,678,232 A | 5/1954 | Barry | |
| 3,195,440 A * | 7/1965 | Coscione | B60H 1/26 454/145 |
| 3,236,169 A * | 2/1966 | Starnaman | B60H 1/248 454/165 |
| 3,391,628 A * | 7/1968 | Ziegenfelder | B60H 1/249 454/164 |
| 3,392,654 A * | 7/1968 | Grenier | B60H 1/248 454/75 |
| 3,805,684 A * | 4/1974 | Atkinson | B60H 1/247 454/164 |
| 4,920,865 A * | 5/1990 | Pasquali | B60H 1/248 454/164 |
| 4,972,765 A | 11/1990 | Dixon | |

(Continued)

FOREIGN PATENT DOCUMENTS

DE     20218221     4/2003

*Primary Examiner* — Justin B Rephann
(74) *Attorney, Agent, or Firm* — David Coppiellie; Carlson, Gaskey & Olds, P.C.

(57) ABSTRACT

A system according to an exemplary aspect of the present disclosure includes, among other things, a door having interior and exterior sides, at least one inlet in the interior side, at least one outlet in the exterior side, and a door protector mechanism to move a protector relative to the door. At least one pressure relief valve is in communication with the inlet and outlet, and is mechanically linked for movement with the protector. A method according to an exemplary aspect of the present disclosure includes, among other things, mechanically linking at least one pressure relief valve for movement with the protector such that the pressure relief valve opens in response to the door beginning to open.

15 Claims, 6 Drawing Sheets

(56) References Cited

U.S. PATENT DOCUMENTS

| | | | | |
|---|---|---|---|---|
| 5,810,427 A | * | 9/1998 | Hartmann | B60R 19/40 280/742 |
| 5,864,989 A | * | 2/1999 | Funatsu | E06B 3/40 49/141 |
| 6,273,127 B1 | * | 8/2001 | Wade | B60H 1/249 137/512.15 |
| 7,204,472 B2 | * | 4/2007 | Jones | F16K 15/031 251/129.06 |
| 8,616,944 B2 | | 12/2013 | Chambo et al. | |
| 9,656,534 B2 | | 5/2017 | Wade | |
| 2009/0068940 A1 | * | 3/2009 | Bloemeling | B60H 1/249 454/162 |
| 2009/0088065 A1 | * | 4/2009 | Mouch | B60H 1/248 454/164 |
| 2010/0099346 A1 | * | 4/2010 | Browne | F16K 17/003 454/70 |
| 2010/0216384 A1 | * | 8/2010 | McCarthy | B60H 1/249 454/70 |
| 2010/0330894 A1 | * | 12/2010 | Alexander | B60H 1/249 454/70 |
| 2012/0003907 A1 | * | 1/2012 | Carlson | B60H 1/00735 454/70 |
| 2013/0072101 A1 | * | 3/2013 | Marleau, Jr. | B60H 1/249 454/143 |
| 2013/0095738 A1 | * | 4/2013 | Marleau | F24F 13/24 454/141 |
| 2014/0273784 A1 | * | 9/2014 | Wade | B60H 1/248 454/70 |
| 2015/0321540 A1 | * | 11/2015 | Kim | B60H 1/249 454/152 |
| 2017/0144516 A1 | | 5/2017 | Iacovoni et al. | |
| 2017/0158021 A1 | * | 6/2017 | Iacovoni | B60H 1/00842 |

* cited by examiner

CLOSED

OPEN

PRESSURE RELIEF VALVE LINKED FOR MOVEMENT WITH DOOR PROTECTOR

TECHNICAL FIELD

This disclosure relates to a method and system to provide a pressure relief valve that is mechanically linked to movement of a door protector to reduce door closing efforts.

BACKGROUND

Vehicles often use air-extractors to influence air flow from a vehicle passenger compartment to enhance passenger comfort and to prevent window fogging. As a climate control system takes in ambient air from outside the vehicle, air exhaustion through the extractors provides for proper circulation and can reduce pressure from building up in the compartment. When a vehicle door is closed, pressure can suddenly rise within the compartment which can result in a high closing effort. Vehicle door closing effort is an important attribute for user satisfaction. If it is too difficult to close a vehicle door, a passenger may become frustrated due to time consuming efforts to close the door when entering and exiting the vehicle.

As door closure effort is directly tied to the in-vehicle air flow rate, it is often difficult to achieve required flow rates to deliver good performance with traditional extractors due to packaging constraints. Typically, two to four air extractors are packaged in a rear portion of the vehicle to deliver the desired flow attributes. Larger air extractor openings allow for adequate air flow but can result in an increase in noise, vibration, and harshness (NVH) performance, which is not desirable. Some NVH solutions use springs to close air extractor flaps until a certain cabin pressure is reached; however, this operation is contrary to climate fogging and door closing efforts. Further, using larger air extractors is also not desired due to packaging constraints.

SUMMARY

A system according to an exemplary aspect of the present disclosure includes, among other things, a door having interior and exterior sides, at least one inlet in the interior side, at least one outlet in the exterior side, and a door protector mechanism to move a protector relative to the door. At least one pressure relief valve is in communication with the inlet and outlet, and is mechanically linked for movement with the protector.

In a further non-limiting embodiment of the foregoing system, the pressure relief valve is closed when the protector is non-deployed and is opened when the protector is deployed to allow air to flow from the inlet to the outlet.

In a further non-limiting embodiment of either of the foregoing systems, the door protector mechanism automatically deploys the protector to cover an outer door edge in response to the door being opened.

In a further non-limiting embodiment of any of the foregoing systems, the door protector mechanism returns the protector to a non-deployed position as the door is closed.

In a further non-limiting embodiment of any of the foregoing systems, the system includes a mechanical connection that couples the door protector mechanism to the pressure relief valve.

In a further non-limiting embodiment of any of the foregoing systems, the mechanical connection comprises a cable or lever.

In a further non-limiting embodiment of any of the foregoing systems, the at least one inlet comprises at least one louver or vent hole located in door trim on the interior side.

In a further non-limiting embodiment of any of the foregoing systems, the door protector mechanism comprises a mechanical drive that includes a cable that is actuated when the door is opened to deploy the protector to cover an outer edge of the door.

In a further non-limiting embodiment of any of the foregoing systems, the pressure relief valve is coupled for movement with the cable to open the pressure relief valve as the door is opened.

In a further non-limiting embodiment of any of the foregoing systems, the system includes a damping assembly to control closing movement of pressure relief valve as the door closes such that air can be exhausted via the outlet before the pressure relief valve closes.

In a further non-limiting embodiment of any of the foregoing systems, the pressure relief valve comprises a first pressure relief valve and including at least one second pressure relief valve associated with the outlet, and wherein the second pressure relief valve is mechanically coupled to the first pressure relief valve.

In a further non-limiting embodiment of any of the foregoing systems, the at least one pressure relief valve comprises at least a first pressure relief valve associated with the inlet and a second pressure relief valve associated with the outlet, the first and second pressure relief valves being mechanically linked for movement together between open and closed positions.

In a further non-limiting embodiment of any of the foregoing systems, the inlet comprises a louver or hole located in an inner door trim panel.

A method according to another exemplary aspect of the present disclosure includes, among other things: providing a door having interior and exterior sides, a door protector mechanism to move a protector relative to the door, and at least one inlet in the interior side and at least one outlet in the exterior side; and mechanically linking at least one pressure relief valve for movement with the protector such that the pressure relief valve opens in response to the door beginning to open.

In a further non-limiting embodiment of the foregoing method, the method includes automatically deploying the protector via the door protector mechanism in response to the door being opened which correspondingly opens the pressure relief valve to allow air to flow from the inlet to the outlet.

In a further non-limiting embodiment of either of the foregoing methods, the method includes moving the protector to a non-deployed position via the door protector mechanism once the door is closed resulting in the pressure relief valve returning to a closed position.

In a further non-limiting embodiment of any of the foregoing methods, wherein the door protector mechanism comprises a mechanical drive that includes a cable, and including actuating the cable when the door is opened to deploy the protector to cover an outer edge of the door, and coupling the pressure relief valve for movement with the cable to open the pressure relief valve as the door is opened.

In a further non-limiting embodiment of any of the foregoing methods, the method includes controlling closing movement of pressure relief valve with a damping assembly as the door closes such that air can be exhausted via the outlet before the pressure relief valve closes.

In a further non-limiting embodiment of any of the foregoing methods, the at least one pressure relief valve comprises at least a first pressure relief valve and a second pressure relief valve, and including associating the first pressure relief valve with the inlet and associating the second pressure relief valve with the outlet.

In a further non-limiting embodiment of any of the foregoing methods, the method includes mechanically linking the first and second pressure relief valves for movement together between open and closed positions.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details exemplary methods and systems that provide a pressure relief valve that is mechanically linked to movement of a door protector to reduce door closing efforts. These and other features are discussed in greater detail in the following paragraphs of this detailed description.

Figure 1A:
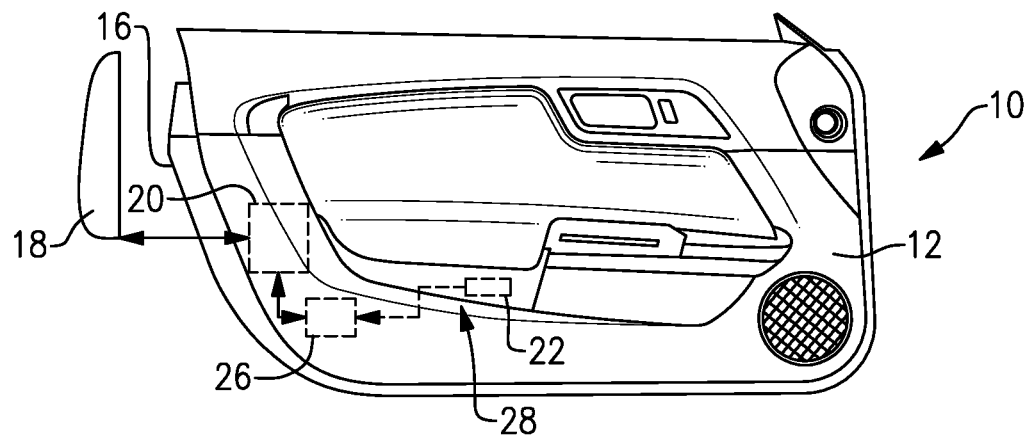
FIG. 1A is a side view of an interior side of a vehicle door with a door edge protector and a schematic representation of a door protector drive mechanism and a valve system incorporating the subject invention.

FIG. 1A shows a door 10 having an interior side 12 that faces a passenger compartment or cabin and an exterior side 14 (FIG. 1B) that faces an environment outside of a vehicle. The door 10 includes an outermost edge 16 that surrounds a periphery of the door 10. A door protector 18 is coupled to a door protector drive mechanism 20 which moves the protector 18 between a non-deployed position (FIG. 2A) and a deployed position (FIG. 2B) where the protector 18 covers the edge 16 of the door. The door protector mechanism 20 is configured such that when the door 10 begins to open, the protector 18 is automatically deployed to cover the edge 16. The protector 18 is made from a plastic or resilient type of material such that when the protector 18 covers the edge 16, the door 10 cannot cause damage to adjacent vehicles when the door 10 is opened.

Figure 1B:
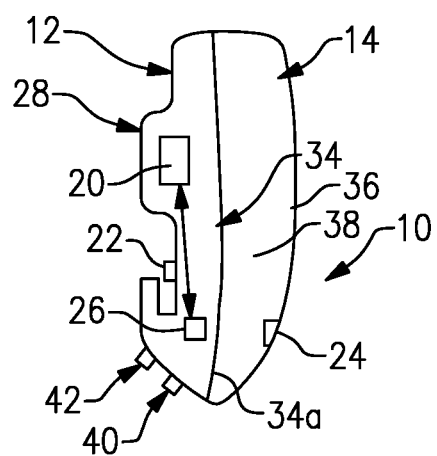
FIG. 1B is a schematic side view of the door of FIG. 1A.
Figure 2A:
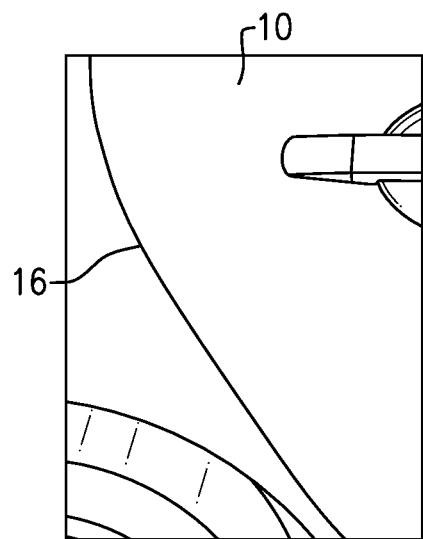
FIG. 2A is a front view of the door of FIG. 1A in a closed position with the protector in a non-deployed position.
Figure 2B:
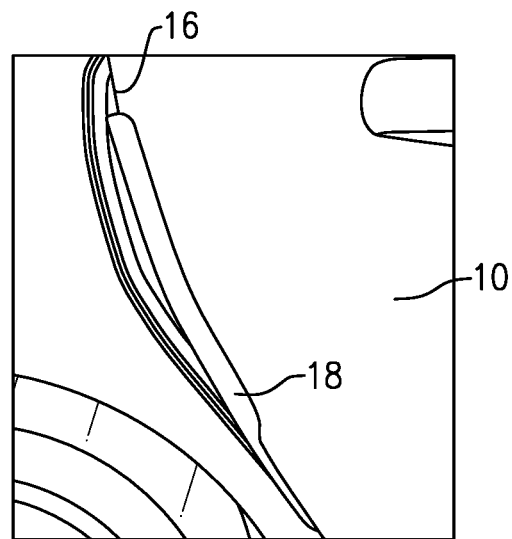
FIG. 2B is a view similar to FIG. 2A but showing the door open and the protector in a deployed position.

As shown in FIG. 1B, the door 10 includes at least one inlet 22 in the interior side 12 and at least one outlet 24 in the exterior side 14. At least one pressure relief valve 26 is mechanically linked to the protector 18 and/or door protector mechanism 20 and is in communication with the inlet 22 and outlet 24. In one example shown FIG. 3, in the inlet 22 is added to door interior side trim 28. For example, the inlet 22 could be located inside a map pocket or on an underside of a door arm rest such that the inlet 22 is hidden from view. In one example, the inlet 22 can comprise one or more louvers 30 and/or vent holes 32.

The door 10 includes a vertically extending J-plane 34 (FIG. 1B) that separates the interior 12 and exterior 14 sides of the door 10. The J-plane 34 is defined at least in part by a sheet metal inner panel 34a. The inlet 22 is located internally of the J-plane 34 and the outlet 24 is located externally relative to the J-plane 34. The door trim 28 is supported by the sheet metal inner panel 34a of the J-plane 34 and a sheet metal outer panel 36 is spaced outward of the inner panel 34a to form a door cavity 38 therebetween. The door protector mechanism 20 is located in the cavity 38 inside of the J-plane 34. The door 10 also includes a primary seal 40 and a secondary seal 42 on the interior side 12 to seal the inside of the door 10 from external noise and elements.

The pressure relief valve 26 is located internally of the J-plane 34 and is mechanically linked for movement with the protector 18 such that the pressure relief valve 26 is closed when the protector 18 is non-deployed and is opened when the protector 18 is deployed. When the pressure relief valve 26 is opened, air from inside the cabin is drawn into the inlet 22, flows through the valve 26, and exits the outlet 24. Thus, the opening movement of door 10 is used to activate the door protector mechanism 20 and correspondingly mechanically open and close the pressure relief valve 26 to reduce cabin pressure during door closing.

As such, the subject invention utilizes this movement of the door protector 18 initiated by door opening movement to additionally open the pressure relief valve 26 to improve door closing efforts. Further, when the door 10 is closed, the mechanical connection returns the pressure relief valve 26 to the closed position after the air has been vented to the outlet 24.

Figure 4:
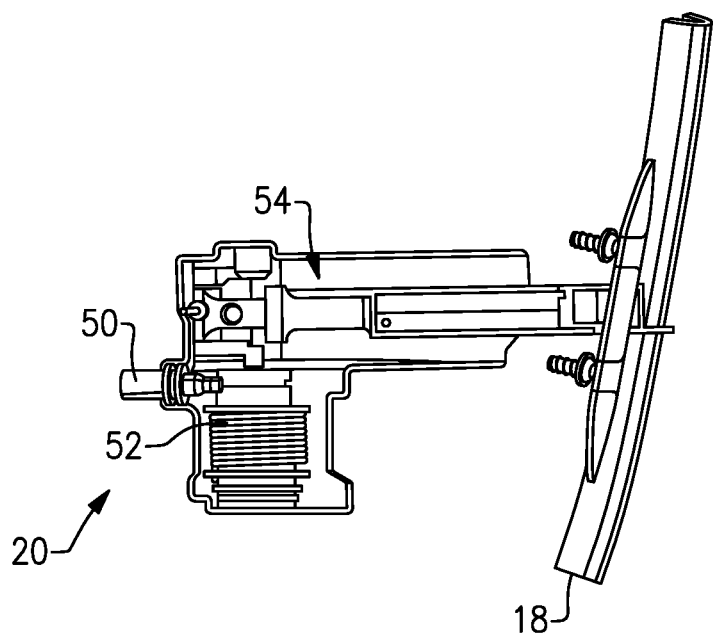
FIG. 4 is a top view of the door protector drive mechanism.

In one example shown in FIG. 4, the door protector mechanism 20 includes a cable 50, a spool 52, and a lever/linkage assembly 54 that is coupled to the protector 18. The protector 18 comprises a thin strip of light weight and durable material such that the door protector mechanism 20 can quickly deploy the protector 18 as the door 10 is opened. In one example, the cable 50 is actuated when the door 10 is opened, which in turn causes the spool 52 to rotate and actuate the lever/linkage assembly 54 to flip the protector 18 over to cover the edge 16 of the door 10. This is one example of a mechanical drive that is used to deploy the protector 18 in response to door opening movement. It should be understood that other types of drives could also be used to deploy the protector 18.

Figure 5A:
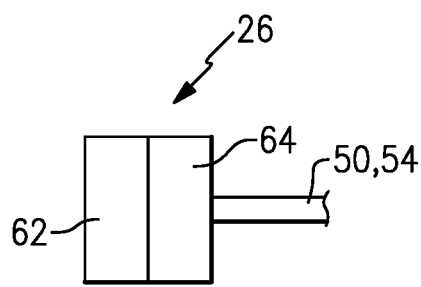
FIG. 5A is a schematic side view of a pressure relief valve coupled to the door protector drive mechanism and in a closed position.
Figure 5B:
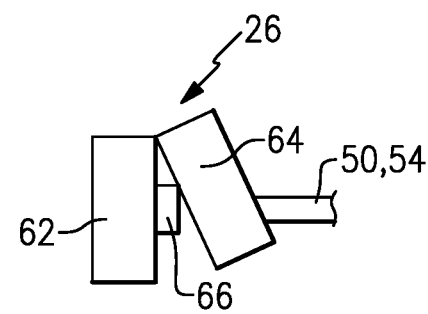
FIG. 5B is similar to FIG. 5A but shows the pressure relief valve in an open position.

In one example shown in FIGS. 5A-B, a component of the door protector mechanism 20, such as the cable 50 or lever/linkage assembly 54 for example, is coupled to the pressure relief valve 26 in addition to being coupled to the door protector 18. The pressure relief valve 26 includes a valve body 62 with a cover, flap, or lid 64 that moves relative to the valve body 62 between open (FIG. 5B) and closed (FIG. 5A) positions. Any type of pressure relief valve can be utilized in this configuration. In one example, the cable 50 is coupled to the lid 64, and when the door 10 begins to open, the cable 50 is pulled which automatically causes the door protector 18 to be deployed as well as opening the lid 64 of the pressure relief valve 26.

Figure 3:
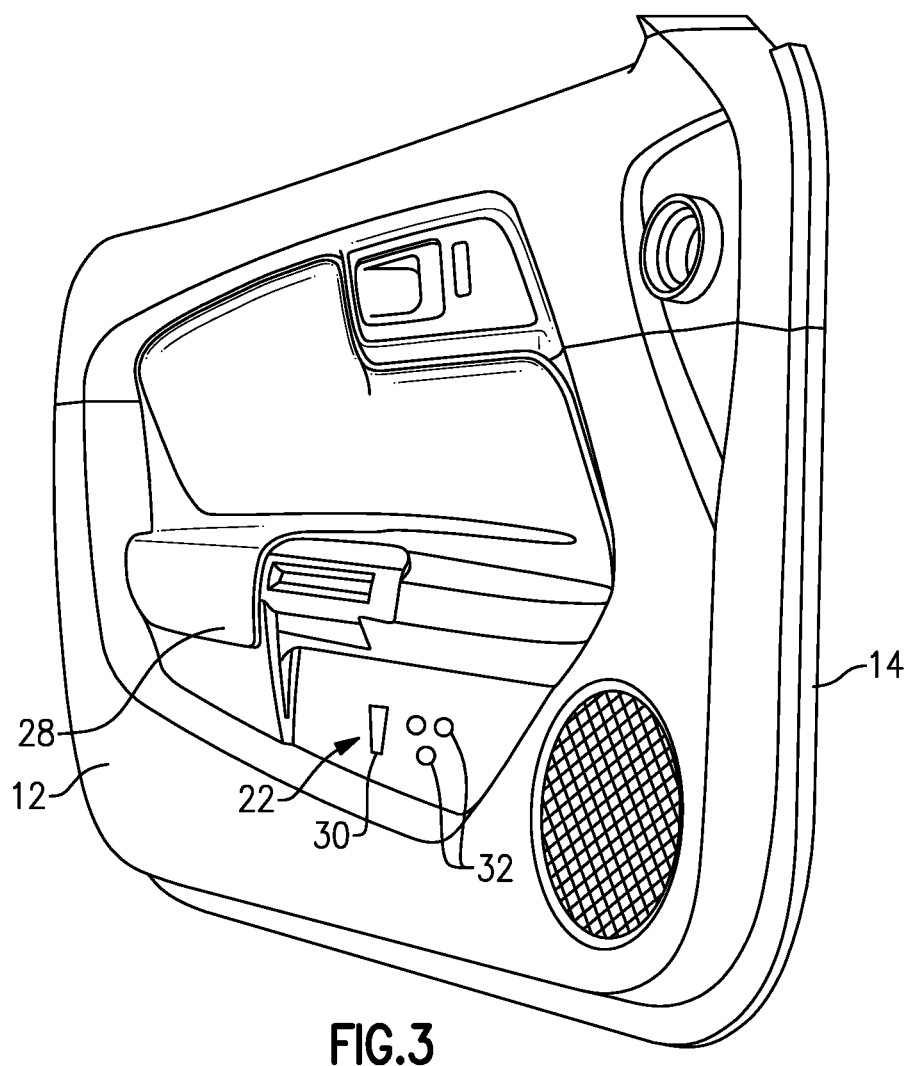
FIG. 3 is a perspective view of an interior side of the door.

When the pressure relief valve 26 is open, air flows through the inlet 22 at the door trim 28, through the valve 26, and then exits the door 10 via the outlet 24 outboard of the J-plane 34 and door seals 40, 42. Air flow out of the outlet 24 can be done with one or more louvers or vents similar to those shown for the inlet 22 as shown in FIG. 3, for example.

The door protector mechanism 20 can also be used to close the pressure relieve valve 26. However, instead of simply allowing the pressure relief valve to immediately return to the closed position, a damper assembly 66 is used to slow closing movement of the valve 26 for a short period, e.g. 2 seconds, of time so that a sufficient amount of air can be exhausted via the outlet 24 to reduce door closing efforts.

Figure 6:
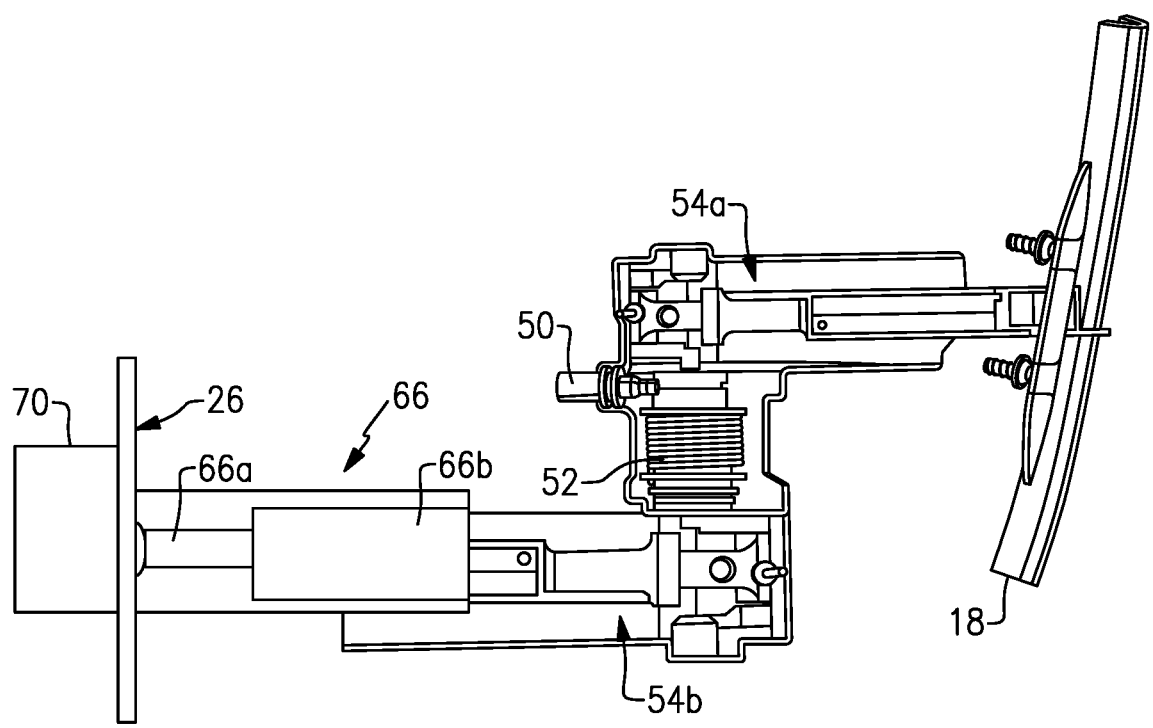
FIG. 6 is a top view of the door protector drive mechanism incorporating an addition lever/linkage assembly into the door protector drive mechanism of FIG. 4 to couple the door protector drive mechanism to the pressure relief valve.

FIG. 6 shows one example of the pressure relief valve 26 being coupled to the lever/linkage assembly 54 of the door protector mechanism 20. As discussed above, the cable 50 is actuated when the door 10 is opened, which in turn causes the spool 52 to rotate and actuate the lever/linkage assembly 54. As shown in FIG. 6, a first lever/linkage assembly 54a is associated with one end of the spool 52 and a second lever/linkage assembly 54b is associated with an opposite end of the spool 52. The first lever/linkage assembly 54a flips the protector 18 over to cover the edge 16 of the door 10 and the second lever/linkage assembly 54b opens the pressure relief valve 26. A spring 66a and a damper 66b, which for example form the damper assembly 66, are associated with the second lever/linkage assembly 54b to control the closing movement of the pressure relief valve 26. Optional NHV damping material 70 could be added to the valve 26 as needed to further reduce noise being introduced into the vehicle.

Figure 7:
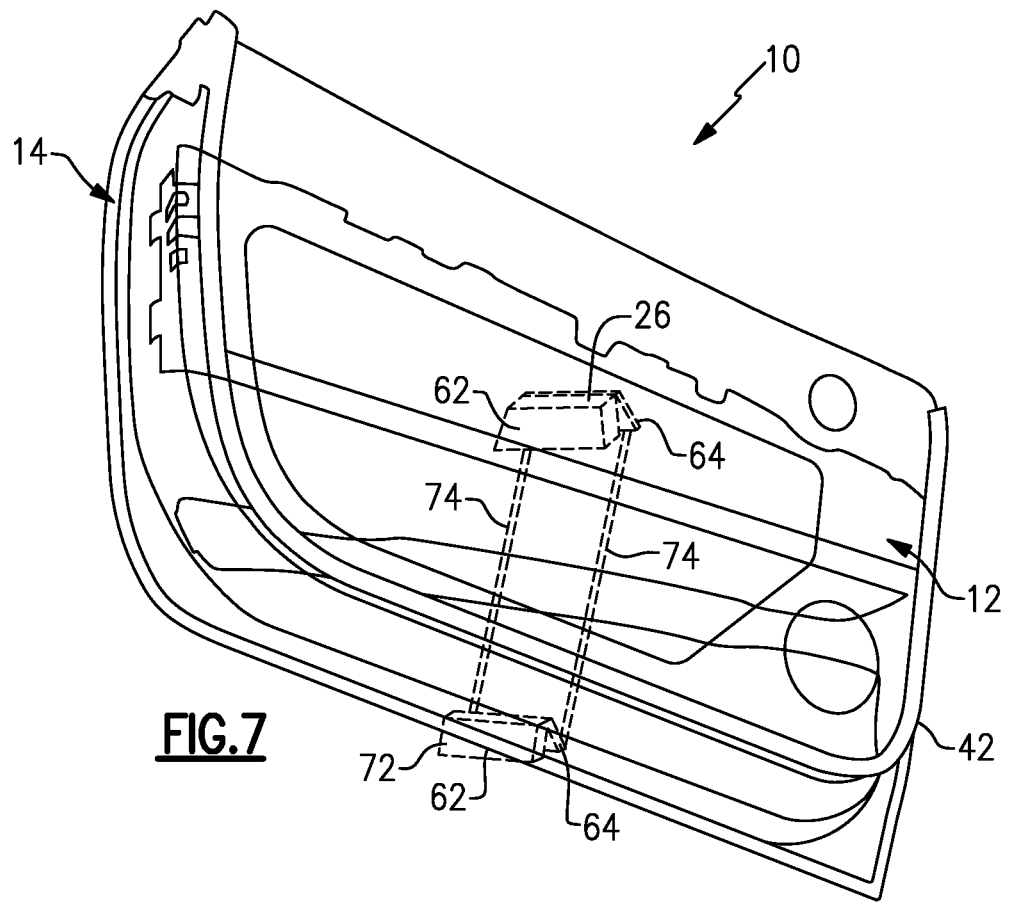
FIG. 7 is a schematic representation of a valve system that includes at least first and second pressure relief valves coupled together.

FIGS. 7 and 8A-8C show one example of an outlet configuration to be associated with the outlet 24 of the door 10. In this example, the internal pressure relief valve 26 comprises a first pressure relief valve and the system includes a second pressure relief valve 72 that is mechanically coupled or linked to the first pressure relief valve 26. As shown in FIG. 7, the first pressure relief valve 26 is located inside the J-plane 34 and the second pressure relief valve 72 is located outside the J-plane 34. In this example, the pressure relief valves 26, 72 each include the valve body 62 and the lid 64 that moves relative to the body 62 to open and close the valves 26, 72. In one example, the lids 64 are connected/linked to each other with one or more connection rods/links 74. As such, when the first pressure relief valve 26 is opened the second pressure relief valve 72 is simultaneously opened.

Figure 8A:
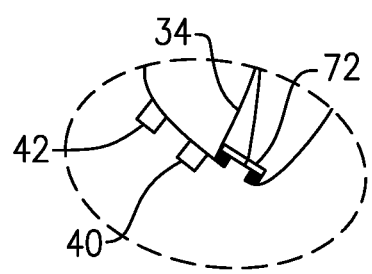
FIG. 8A is a side schematic view of the door including the valves of FIG. 7.
Figures 8B, 8C:
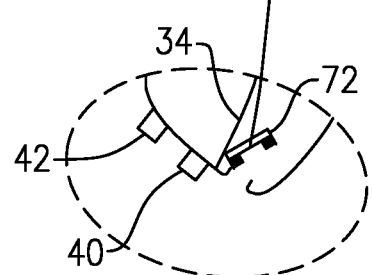
FIG. 8B is a view similar to FIG. 8A and shows the valves linked together and in the closed position.
FIG. 8C is a view similar to FIG. 8B but showing the valves linked together and in the open position.

FIG. 8A shows the second pressure relief valve 72 in relation to the J-plane 34. FIG. 8B shows the second pressure relief valve 72 in the closed position. FIG. 8C shows the first pressure relief valve 26 in the open position with the link 74 coupling the first pressure relief valve 26 and second pressure relief valve 72 together to simultaneously move the second pressure relief valve 72 to the open position in response to movement of the first pressure relief valve 26. The second pressure relief valve 72 can be used to provide a sealing function at the outlet 24 such that vehicle dynamic concerns, such as water management, noise, etc. for example, could be addressed. Insulating material could also be included in the second pressure relief valve 72 to further reduce noise from traveling through the valve 72 and into the cabin.

In one example, the valve housing or body 62 is made from a plastic, light-weight material. The flap or lid 64 can also be made from a plastic material. A sealing interface between the lid 62 and body 62 can be provided by a foam or rubber material that extends three hundred and sixty degrees about the sealing plane. In one example, sound absorbing or other insulating material is integrated into the lid 64 to reduce road noise. A drain hole can also be provided at a location below the valve(s) to allow any water that enters the door cavity to drain out.

Figure 9:
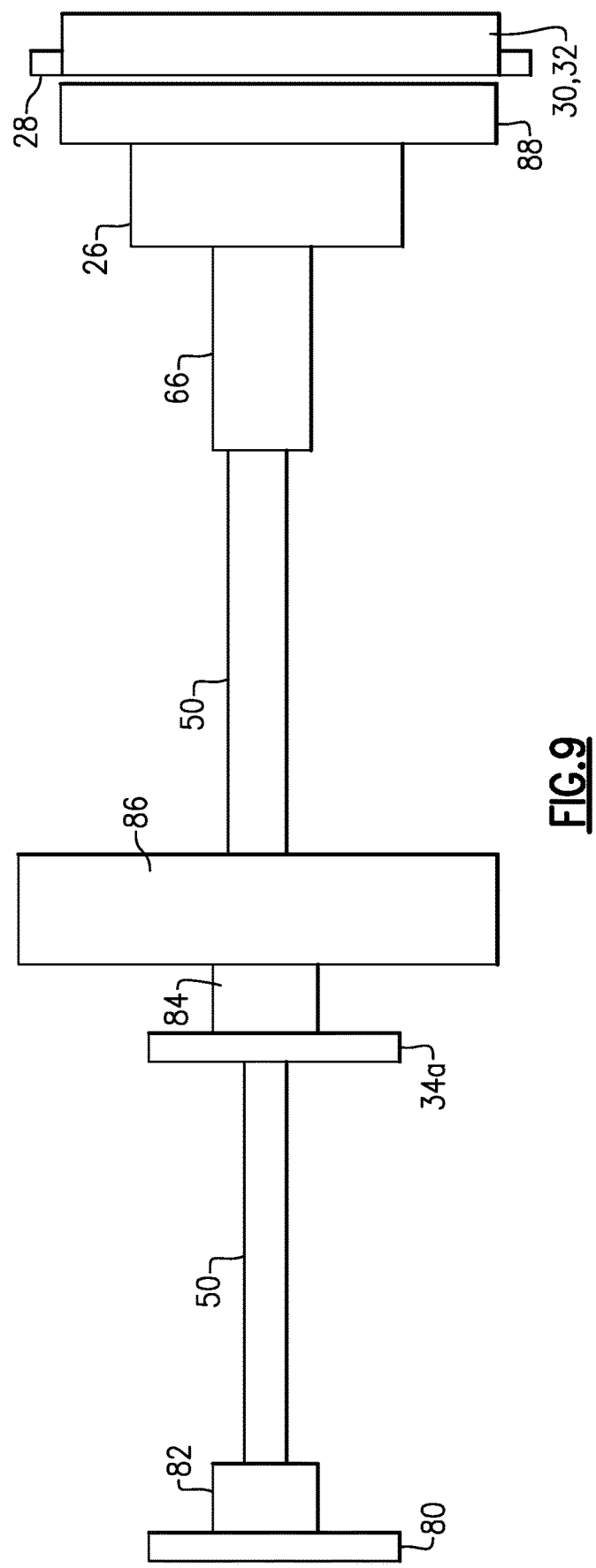
FIG. 9 is a motion path of the protector and valve system.

FIG. 9 discloses an example motion path for the system. A body side structure 80 includes a first fixture 82 for the cable 50 and the door inner panel 34a includes a second fixture 84 for the cable 50. The second fixture 84 also cooperates with a pushing or pulling mechanism 86, such as a plunger for example, which is coupled to the cable 50. The cable 50 is also coupled to the damper assembly 66 which slows down the closing movement of the air extractor/pressure relief valve 26. The door interior side trim 28 includes the louver 30 or vent holes 32 that direct air through an opening 88 in the inner panel. The pushing or pulling mechanism 86 allows the cable 50 to transfer the motion of the protector 18 to the pressure relief valve 26, causing the valve 26 to open when the protector 18 is deployed.

The subject invention allows for a more efficient package design for a pressure relief valve within a door to reduce closing effort. By modifying the existing door protector drive mechanism, the pressure relief valve can additionally be opened while moving the protector into place. The use of a damper keeps the valve open while the door closes such that the airflow can be exhausted at a bottom of the door below the cabin seals. Once the damping force is overcome, the valve will return to the closed position. The subject invention provides a low cost solution while significantly improving in-vehicle airflow only when needed. As such, there is little or no vehicle NVH impact. Air extractors in a rear of the vehicle can accordingly be reduced in size, which means better NVH performance with reduced NVH content.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A system, comprising:
a door having interior and exterior sides and including at least on outer edge;
at least one inlet in the interior side and at least one outlet in the exterior side;
a door protector mechanism to move a protector relative to the door to cover at least a portion of the outer edge of the door; and
at least one pressure relief valve in communication with the inlet and outlet, and being mechanically linked for movement with the protector.

2. The system according to claim 1, wherein the pressure relief valve is closed when the protector is non-deployed and is opened when the protector is deployed to allow air to flow from the inlet to the outlet.

3. The system according to claim 2, including a mechanical connection that couples the door protector mechanism to the pressure relief valve.

4. The system according to claim 3, wherein the mechanical connection comprises a cable or lever.

5. The system according to claim 1, wherein the at least one inlet comprises at least one louver or vent hole located in door trim on the interior side.

6. The system according to claim 1, wherein the at least one pressure relief valve comprises at least a first pressure relief valve associated with the inlet and a second pressure relief valve associated with the outlet, the first and second pressure relief valves being mechanically linked for movement together between open and closed positions.

7. The system according to claim 6, wherein the inlet comprises a louver or hole located in an inner door trim panel.

8. The system according to claim 1, wherein the at least one outer edge comprises a peripheral edge that extends about a periphery of the door, and wherein the door protector comprises a strip of material that covers a portion of the peripheral edge.

9. The system according to claim 1, wherein the at least one pressure relief valve includes a fixed valve body and a moveable valve portion that moves relative to the fixed valve body between an open position and a closed position, and wherein the protector and the moveable valve portion are linked for movement together such that when the movable valve portion is open the protector covers a portion of the outer edge of the door.

10. A system, comprising:
a door having interior and exterior sides;
at least one inlet in the interior side and at least one outlet in the exterior side;
a door protector mechanism to move a protector relative to the door; and
at least one pressure relief valve in communication with the inlet and outlet, and being mechanically linked for movement with the protector, and wherein the pressure relief valve is closed when the protector is non-deployed and is opened when the protector is deployed to allow air to flow from the inlet to the outlet, and wherein the door protector mechanism automatically deploys the protector to cover an outer door edge in response to the door being opened.

11. The system according to claim 10, wherein the door protector mechanism returns the protector to a non-deployed position as the door is closed.

12. A system, comprising:
a door having interior and exterior sides;
at least one inlet in the interior sides and at least one outlet in the exterior side;
a door protector mechanism to move a protector relative to the door; and
at least one pressure relief valve in communication with the inlet and outlet, and being mechanically linked for movement with the protector, and wherein the door protector mechanism comprises a mechanical drive that includes a cable that is actuated when the door is opened to deploy the protector to cover an outer edge of the door.

13. The system according to claim 12, wherein the pressure relief valve is coupled for movement with the cable to open the pressure relief valve as the door is opened.

14. The system according to claim 13, including a damping assembly to control closing movement of pressure relief valve as the door closes such that air can be exhausted via the outlet before the pressure relief valve closes.

15. The system according to claim 13, wherein the pressure relief valve comprises a first pressure relief valve and including at least one second pressure relief valve associated with the outlet, and wherein the second pressure relief valve is mechanically coupled to the first pressure relief valve.

* * * * *

UNITED STATES PATENT AND TRADEMARK OFFICE
CERTIFICATE OF CORRECTION

PATENT NO. : 10,639,963 B2  
APPLICATION NO. : 15/834164  
DATED : May 5, 2020  
INVENTOR(S) : Mukdam Kena and Michael Murphy McElroy Page 1 of 1

It is certified that error appears in the above-identified patent and that said Letters Patent is hereby corrected as shown below:

In the Claims

In Claim 1, Column 7, Line 6-7; replace "at least on outer edge" with --at least one outer edge--

Signed and Sealed this  
First Day of March, 2022

Drew Hirshfeld  
*Performing the Functions and Duties of the*  
*Under Secretary of Commerce for Intellectual Property and*  
*Director of the United States Patent and Trademark Office*